(No Model.)
C. L. HEALY.
QUADRUPLEX TELEGRAPHY.
No. 398,614. Patented Feb. 26, 1889.
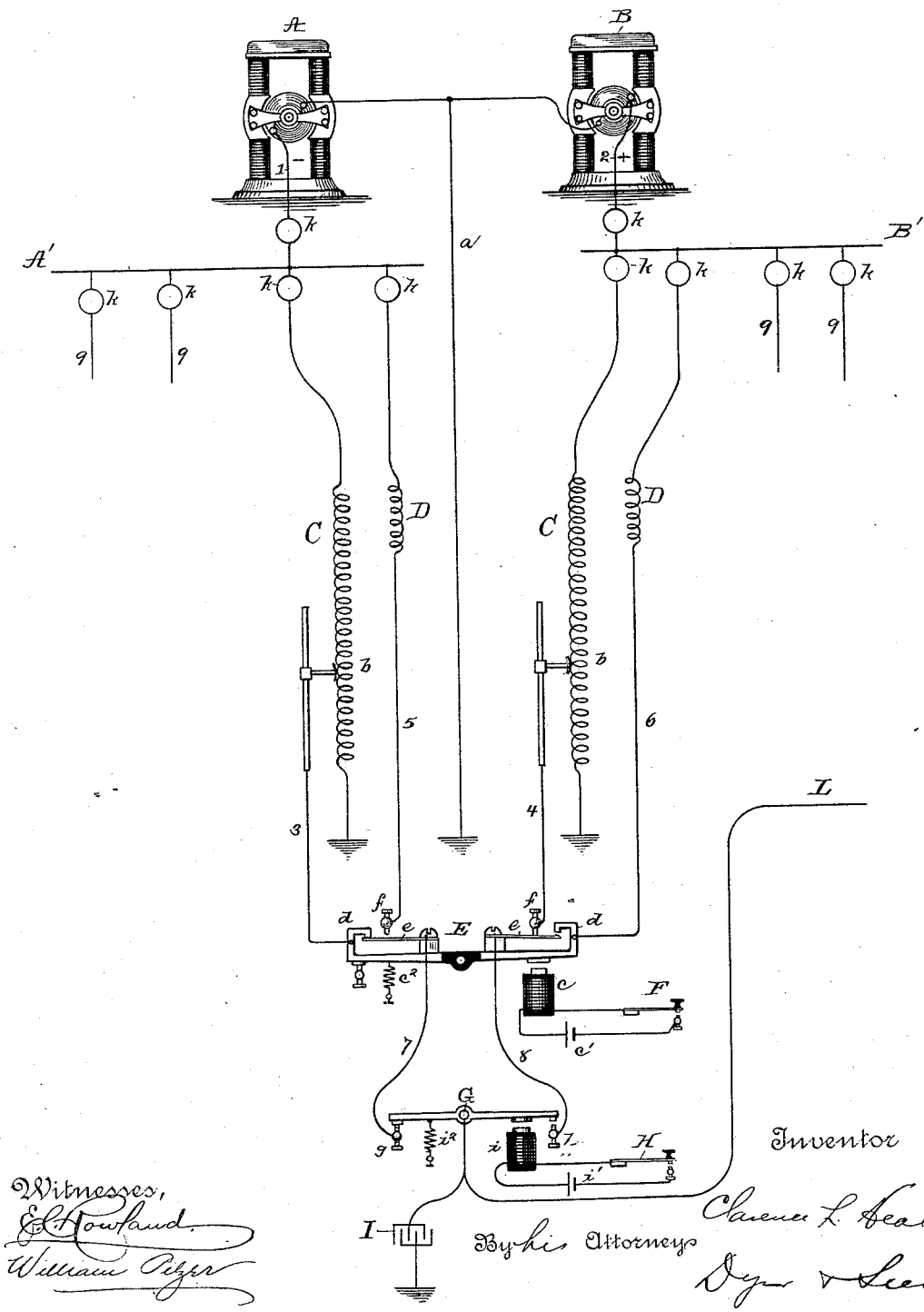

UNITED STATES PATENT OFFICE.

CLARENCE L. HEALY, OF BROOKLYN, NEW YORK.

QUADRUPLEX TELEGRAPHY.

SPECIFICATION forming part of Letters Patent No. 398,614, dated February 26, 1889.

Application filed January 16, 1888. Serial No. 260,928. (No model.)

*To all whom it may concern:*

Be it known that I, CLARENCE L. HEALY, of Brooklyn, in the county of Kings and State of New York, have invented a certain new and useful Improvement in Quadruplex Telegraphs, of which the following is a specification.

My invention relates to the operation of quadruplex telegraphs by dynamo-electric machines; and its object is to provide means for this purpose which will be efficient, will not disturb the balance of the line, and will not cause excessive sparking at the contacts of the current-transmitters.

The invention consists in the means employed for obtaining varying electro-motive forces from one source of electrical energy, and especially when that source is a dynamo-electric machine, without disturbing the balance of the line, in the means employed for utilizing this principle in connection with two dynamos or other sources of electrical energy for giving at the same time reversals of the polarity of the current, in the instruments and connections employed for controlling the transmission of the currents, and in the several novel combinations of parts, as fully hereinafter explained, and pointed out by the claims.

In carrying out my invention I employ two dynamos with opposite poles grounded for giving the reversals of the line-current, the double-current transmitter throwing one dynamo or the other into connection with the line, according to whether the key controlling it is opened or closed. For changing the volume or quantity of current without regard to its polarity, each dynamo is arranged and connected so as to be capable of a direct-line connection or a shunt-line connection, so that the line will be presented with widely-differing electro-motive forces, according to which connection is completed, and at the same time an incoming current will find a path to ground of approximately the same resistance, whether one connection or the other is made, and hence the balance of the line for incoming currents will not be materially disturbed.

The details of the apparatus will be better understood by reference to the accompanying drawing, forming a part hereof, in which the figure is a view, principally in diagram, of an apparatus embodying the invention.

Since the invention relates only to the means for supplying the current to the line, the receiving-relays and the means for duplexing the line are not shown, these being of the usual or any suitable form and construction.

A and B are two dynamo-electric machines, which are connected together by their plus and minus terminals, respectively, and to a common earth-connection, $a$. The minus terminal 1 of A and the plus terminal 2 of B are connected, respectively, to mains A' and B', from each of which there is a connection to ground through a resistance, C, at similar points, $b$, along the length of which resistances are made line-connections 3 4. Other line-connections, 5 6, are made with the plus and minus dynamo-mains A' B' through suitable balancing-resistances, D.

E is a double continuity-preserving lever. It is moved by a key, F, through magnet $c$ and battery $c'$, and retracted by a spring, $c^2$. This lever is divided by insulation at its center and carries on each end a hook, $d$, and insulated spring $e$, taking under the hook and bearing thereon except when depressed by meeting the contact-stop $f$. At one end of the lever E (shown as the left-hand end in the drawing) the shunt-connection 3 of the dynamo A is connected with the hook $d$, while the direct connection 5 runs to the contact-stop $f$. At the other end of the lever E the connections from the dynamo B are made in the reverse order, the shunt-connection 4 running to the contact-stop $f$, while the direct connection 6 runs to the hook $d$. Thus when the lever E is retracted the shunt-line connection from each dynamo is completed at the lever, while when the lever is drawn forward the direct connection from each dynamo is completed at the lever.

The double-current transmitter may be a simple centrally-pivoted lever, G, whose back and front contact-stops, $g$ $h$, are connected by wires 7 and 8 with the springs $e$ at the left and right hand ends, respectively, of the lever E. The lever G is connected with the line L. It is moved forward by a key, H, through a magnet, $i$, and battery $i'$, and is retracted by a spring, $i^2$. By the movement of the lever G it will be seen that the line will be connected with the spring $e$ at the left or right hand end of the lever E, according to whether said lever G is on its back or front stop. Thus the function of the key H is to reverse the polarity of the current without regard to its strength, while the function of the key F is to change the strength of the current without regard to its polarity.

The dynamos and lines are protected by suitable fusible cut-outs or safety-catches, $k$, as will be well understood, and other connections, 9, may be taken from the mains A' B' for electric-lighting or other purposes.

It will be seen that by taking the line-connections 3 4 from intermediate points along the length of the resistances C an electro-motive force can be obtained which will be to the desired degree less than the full electro-motive force of the dynamo. Assuming that each dynamo has an electro-motive force of three hundred volts, and that each resistance C measures eight hundred ohms, the ohms per volt will be 2.6. To obtain a definite electro-motive force for each shunt-connection, the point of connection with the resistance I have found can be correctly located by multiplying the volts required by the ohms per volt, the result being the distance in ohms from the earth end of the resistance. If I want the point of connection for getting one hundred volts, the result is two hundred and sixty ohms, which is the distance from the ground end of the resistance. This is substantially correct when a long telegraph-line is connected to point $b$ of the resistance C.

The connection of 3 and 4 with the resistances C may be fixed or adjustable, as may also be the resistances D.

The resistances D are used to balance, or approximately balance, the line for incoming currents. The dynamos will present their full electro-motive force to the line through the resistances D; but those resistances serve to make the path to ground for incoming currents the same, or practically the same, in resistance, whether by the shunt or the direct connection. The resistance D is made equal to the joint resistance of the divided coil C. In the case assumed it is the joint resistance of two hundred and sixty and five hundred and forty, which is equal to one hundred and seventy-five ohms.

With my arrangement of apparatus I have found that the sparking at the contacts of the transmitting-instruments is practically avoided. So far as the contacts at the lever E are concerned, this freedom from sparking is due to the fact that when springs $e$ pass from contact 3 to 5 or 4 to 6 the direct current from 5 or 6 cannot be short-circuited, as it has the balancing resistance D and that portion of resistance C from the point $b$ to the ground to pass through. The line is never broken at these points; consequently no discharge from the line occurs here. At lever G the line is interrupted each time of reversal and discharges, which produces a small spark. This I prevent entirely by a ground-connection of the line through a condenser, I.

This condenser has also the effect of preventing the relays at the distant end of the line from being affected by the battery at such distant end when the line is opened by the movement of the lever G, the continuity of the line being maintained momentarily by the condenser. This is a matter of importance where the reversing-key is not a continuity-preserving key itself.

The objections of disturbing seriously the balance of the line and of bad sparking at the contacts of the instruments have been present in the arrangement heretofore employed for operating quadruplex telegraphs by dynamos.

What I claim is—

1. In telegraphs, the combination, with a line, of a dynamo or other source of electrical energy grounded at one pole, a ground through resistance from the other pole of the dynamo, a direct-line connection from the latter pole of the dynamo through a balancing-resistance, a shunt-line connection from an intermediate point on the grounded resistance, and a key placing the direct and shunt connections alternately to line, substantially as set forth.

2. In telegraphs, the combination, with a line, of two dynamos or other sources of electrical energy grounded directly at opposite poles, a ground through resistance from the other pole of each dynamo, a direct-line connection from the latter pole of each dynamo through a balancing-resistance, a shunt-line connection from an intermediate point on each grounding-resistance, a key placing the shunt or direct connections alternately to line, and a key closing the line to the dynamos alternately, substantially as set forth.

3. In telegraphs, the combination, with a line, of two dynamos or other sources of electrical energy grounded at opposite poles, two line-connections from the other pole of each dynamo, giving different electro-motive forces, a lever having two sets of continuity-preserving contacts insulated from each other and connected with the line-connections of the two dynamos, respectively, a second lever connecting these sets of continuity-preserving contacts alternately with the line, and a grounded condenser connected with the line before it reaches said second lever, substantially as set forth.

This specification signed and witnessed this 4th day of January, 1888.

CLARENCE L. HEALY.

Witnesses:
 WM. HEYSE,
 T. HEGINBOTHAM.